(12) United States Patent
Kimura et al.

(10) Patent No.: US 7,610,601 B2
(45) Date of Patent: Oct. 27, 2009

(54) APPARATUS AND METHOD FOR AUTOMATICALLY RECORDING CONTENT, AND RECORDING MEDIUM AND PROGRAM THEREOF

(75) Inventors: Hitoshi Kimura, Kanagawa (JP);
Kensuke Ohnuma, Tokyo (JP);
Hidetoshi Ichioka, Tokyo (JP)

(73) Assignee: Sony Corporation (JP)

( * ) Notice: Subject to any disclaimer, the term of this patent is extended or adjusted under 35 U.S.C. 154(b) by 581 days.

(21) Appl. No.: 10/491,852

(22) PCT Filed: Aug. 7, 2003

(86) PCT No.: PCT/JP03/10070

§ 371 (c)(1),
(2), (4) Date: Feb. 23, 2005

(87) PCT Pub. No.: WO2004/015993

PCT Pub. Date: Feb. 19, 2004

(65) Prior Publication Data

US 2005/0120371 A1    Jun. 2, 2005

(30) Foreign Application Priority Data

Aug. 7, 2002  (JP)  ............... 2002-230366

(51) Int. Cl.
*H04N 5/445* (2006.01)
*H04N 7/025* (2006.01)
*H04H 60/33* (2008.01)
*G06F 17/30* (2006.01)

(52) U.S. Cl. ............... 725/46; 725/9; 725/34; 725/36; 725/39; 725/47; 725/48; 725/50; 707/3; 707/4; 707/10

(58) Field of Classification Search ............ 386/E5.001, 386/E5.043, E5.006, E7.024, E7.034, E7.036, 386/E7.061, E7.069; 707/3, 4, 10, E17.009; 725/9, 34, 36, 39, 47, 48, 50
See application file for complete search history.

(56) References Cited

U.S. PATENT DOCUMENTS 5,734,444 A    3/1998  Yoshinobu
(Continued)

FOREIGN PATENT DOCUMENTS

EP    1 158 795 A2    5/2001
(Continued)

*Primary Examiner*—Thai Tran
*Assistant Examiner*—Syed Y Hasan
(74) *Attorney, Agent, or Firm*—Lerner, David, Littenberg, Krumholz & Mentlik, LLP

(57) ABSTRACT

An automatic recording apparatus for content includes a preference operation history managing unit operable to generate history information of an operation relating to a preference for a content according to a plurality of operations relating to a preference for the content and explanation information relating to the content and by using a preference value parameter for each kind of these operations; a preference information managing unit operable to generate and renew preference information including a preference value with respect to a plurality of elements relating to a preference for the content according to the history information; and a content recommending unit operable to calculate a preference degree for the content according to the preference information and the explanation information with respect to the content and to make a content record reservation according to the preference degree; wherein the content is recorded according to the content record reservation. In this way, contents are recorded automatically in conformity with a user's complicated and diversified preferences based on various operations by the user relating to the content preferences.

26 Claims, 9 Drawing Sheets

U.S. PATENT DOCUMENTS

| | | | |
|---|---|---|---|
| 6,212,097 B1 * | 4/2001 | Kihara et al. | 365/185.04 |
| 6,973,665 B2 * | 12/2005 | Dudkiewicz et al. | 725/46 |
| 7,146,627 B1 * | 12/2006 | Ismail et al. | 725/47 |
| 2001/0054178 A1 * | 12/2001 | Lee et al. | 725/9 |
| 2002/0016963 A1 * | 2/2002 | Inoue et al. | 725/39 |
| 2002/0059584 A1 * | 5/2002 | Ferman et al. | 725/34 |
| 2002/0069403 A1 | 6/2002 | Itoh et al. | |
| 2002/0104087 A1 * | 8/2002 | Schaffer et al. | 725/46 |
| 2002/0178448 A1 * | 11/2002 | Te Kiefte et al. | 725/46 |
| 2002/0188949 A1 * | 12/2002 | Wang et al. | 725/46 |
| 2002/0199193 A1 * | 12/2002 | Gogoi et al. | 725/46 |

FOREIGN PATENT DOCUMENTS

| | | |
|---|---|---|
| JP | 8-180504 A1 | 7/1996 |
| JP | 2000-59745 A1 | 2/2000 |
| JP | 2000-155764 A1 | 6/2000 |
| JP | 2000-295554 A1 | 10/2000 |
| JP | 2002-152618 A1 | 5/2002 |
| WO | WO-02/11445 A2 | 2/2002 |

* cited by examiner

FIG. 3

| Kind of Operation | Operation Preference Value Parameter |
|---|---|
| Video-Record Reservation | Pref_operation(manual_rec) |
| Erase Protection | Pref_operation(autodelete_protect) |
| Cancellation of Video-Record Reservation [Operation, Automatic] | Pref_operation(recreserve_cancel) |
| Keyword Registration | Pref_operation(keyword) |

FIG. 4

| Preference Element | Coefficient Parameter |
|---|---|
| Title Keyword | Coeff_titlekeyword |
| Keyword | Coeff_keyword |
| Genre | Coeff_genre |
| Broadcasting Time Zone [Weekdays And Saturday/Sunday Are Discriminated] | Coeff_timezone |
| Broadcast Station | Coeff_station |

FIG. 5

| Preference Element | Upper-Limit Value Parameter of Preference Value |
|---|---|
| Title Keyword | Upperlim_titlekeyword |
| Keyword | Upperlim_keyword |
| Genre | Upperlim_genre |
| Broadcasting Time Zone | Upperlim_timezone |
| Broadcast Station | Upperlim_station |

APPARATUS AND METHOD FOR AUTOMATICALLY RECORDING CONTENT, AND RECORDING MEDIUM AND PROGRAM THEREOF

CROSS-REFERENCE TO RELATED APPLICATIONS

The present application is a national stage application under 35 U.S.C. §371 of International Application No. PCT/JP03/10070, filed Aug. 7, 2003, which claims priority from Japanese Application No. P2002-230366, filed Aug. 7, 2002, the disclosures of which are hereby incorporated by reference herein.

BACKGROUND OF THE INVENTION

The present invention relates to an apparatus and a method for automatically recording a content such as a television program according to various operations with reference to the preference of users, and also relates to a recording medium and a program thereof.

In digital television broadcasting which has gotten into stride in recent years, EPG information which includes information showing a program title (title character sequence information), information explaining the details of the program and the like are transmitted from the broadcast station together with the video and audio data of the programs. A television receiver of the digital broadcasting correspondence can display an electronic program guide on the screen according to the EPG information.

Furthermore, there is some analog television broadcasting where such EPG information is also transmitted.

In the prior art, users carried out the operation of the video-recording and/or the video-record reservation in order to record the programs for such a television receiver. More specifically, users carried out the operation of the video-recording at the time they found programs they wanted to record or carried out the operation of the video-record reservation at the time they found programs they wanted to record in the electronic program guide while they were channel surfing (channel change operation).

Further, there are some television receivers which have a function in which users can carry out a registering operation of preference information such as program names and keywords such that recording reservations can be performed by searching programs according to the registered preference information. In the case of such television receivers, users sometimes carried out the operation of the video-recording and/or the video-record reservation by finding programs which they wanted to record in the program search result.

However, it takes a lot of trouble and time to carry out surfing of many channels in the digital television broadcasts or to confirm programs of these many channels by the electronic program guide and at the same time, there is a possibility to overlook programs which are desired to be recorded.

Further, in recent years, it has become possible to record a lot of programs on a high-capacity recording medium such as a hard disc, but it also takes a lot of trouble and time if the video-recording operation and/or the video-record reserving operation is performed for each of the individual programs when a lot of programs are intended to be recorded and at the same time, there is a possibility that some programs will be missed (not recorded).

Furthermore, there were inconveniences as shown as (a) to (c) hereinafter in the video-record reservation function according to the preference information such as program names and keywords which were registered by users.

(a) In recent years, the preferences of users have become complicated and diversified. Therefore, it takes a lot of trouble and time to register all the preference information. Additionally, there are not a few cases where the preference cannot be expressed well only by the program names or keywords and in such a case, exact preference information cannot be registered.

(b) If the preference of the users changes in accordance with the lapse of time, the registration operation must be renewed.

(c) There are various operations other than the keyword registering operation in the operations of the users relating to the preference of the programs, but these operations are not reflected on the video-record reservation.

In view of the aforementioned problem, the present invention was made according to a subject in which a content such as a television program can be recorded automatically in compliance with the complicated and diversified preferences of users according to various operations of the users relating to the preference of the content.

SUMMARY OF THE INVENTION

In order to solve the problem, the present applicant proposes an automatic recording apparatus for content which includes preference operation history managing means for generating history information of a plurality of operations relating to a preference for a content and explanation information relating to the content using a preference value parameter for each kind of the plurality of operations; preference information managing means for generating and renewing preference information including a preference value with respect to a plurality of elements relating to a preference for the content according to the history information; and content recommending means for calculating a preference degree for the content according to the preference information and the explanation information with respect to the content and for making a content record reservation according to the preference degree; wherein the content is recorded according to the content record reservation made by the content recommending means.

In this automatic recording apparatus, when users perform an operation relating to a preference for a content, history information of an operation relating to the preference for the content is generated by the preference operation history managing means using the preference value parameter for each kind of the plurality of operations and the explanation information (for example, EPG information in case of television broadcasting) relating to the contents which become objects of these operations.

Subsequently, the preference information including a preference value with respect to a plurality of elements relating to the preference for the content is generated and renewed by the preference information managing means according to the history information.

Subsequently, a preference degree for the content is calculated according to the preference information and the explanation information with respect to the content by the content recommending means and a record reservation of the content is made according to the preference degree. Then, the record reserved content is recorded, so that the content is recorded automatically.

In this way, according to the automatic recording apparatus, the content is recorded automatically according to the plurality of operations relating to the preference for the content. Additionally, the history information is generated by using the preference value parameter for each kind of the plurality of operations, so that the reflection degree for each kind of the plurality of operations relative to the automatic record of the content can be set/changed arbitrarily by setting/changing the preference value parameter.

In this way, the content can be recorded automatically in conformity with the complicated and diversified preferences of users according to various operations of users relating to the preferences for the contents.

Here, in the automatic recording apparatus, it is preferable as an example that the plurality of operations include a record reservation operation, an erase protecting operation, a canceling operation for the record reservation, a keyword registering operation and the like.

Further, in the automatic recording apparatus, it is preferable as an example that the preference operation history managing means pick up a keyword from the explanation information by using a keyword dictionary and that the picked up keyword be included in the history information when an operation other than the keyword registering operation is performed.

In this way, a keyword relating to the preference for the content is picked up automatically from other than the operation of the keyword registration and it is possible for the keyword to reflect on the automatic record of the content. Accordingly, it is possible for the complicated and diversified preferences of users to be discriminated more definitely so as to perform the automatic record of the content.

Further, in the automatic recording apparatus, it is preferable as an example that the preference information managing means generate and renew the preference information by using a coefficient parameter for each of the plurality of elements.

In this way, it also is possible for the reflection degree of each element relative to the automatic record of the content be set/changed arbitrarily by setting/changing the coefficient parameter.

Further, in the automatic recording apparatus, it is preferable as an example that the plurality of elements include a keyword, a genre, a distribution time zone of the content and a distributing agency of the content.

Further, in the automatic recording apparatus, it is preferable as an example that the number of keywords included in the plurality of elements relating to the preference have a limitation and when the limitation is exceeded, at least one keyword having a preference value equal to or less than a predetermined value is deleted from the plurality of elements.

Further, in the automatic recording apparatus, it is preferable as an example for the preference information managing means to equally compress all of the preference values relating to the elements included in the plurality of elements relating to the preference, including preference values which exceed a predetermined upper-limit value.

In this way, the preference value with reference to the element including the preference value which exceeds the upper-limit value in the preference information will have more gravity of the preference value which is based on the operations of users thereafter (the gravity of the previous preference values according to the operations of users conversely become smaller). Consequently, it is possible for a content in conformity with the preference of the users at the present time to be recorded automatically in correspondence with the preference change of users over time.

Further, in the automatic recording apparatus, it is preferable as an example that the content recommending means make a content record reservation for contents based on a size of vacant regions of the recording apparatus and a size of the preference degree for each of the contents.

Next, the present applicant proposes an automatic recording apparatus for content which includes preference operation history managing means for generating history information of a plurality of operations relating to a preference for a content and explanation information relating to the content and for picking up a keyword from the explanation information by using a keyword dictionary when an operation other than a keyword registering operation is performed so as to include the picked up keyword in the history information; preference information managing means for generating and renewing preference information including a preference value with respect to a plurality of elements relating to a preference for the content according to the history information; and content recommending means for calculating a preference degree for the content according to the preference information and the explanation information with respect to the content and for making a content record reservation according to the preference degree; wherein the content is recorded according to the content record reservation made by the content recommending means.

In this automatic recording apparatus, when users perform an operation relating to a preference for a content, history information of an operation relating to the preference for the content is generated by the preference operation history managing means according to these operations and the explanation information relating to the contents which become objects of these operations. Furthermore, a keyword is picked up from the explanation information by the preference operation history managing means using a keyword dictionary when an operation other than the keyword registering operation is performed and the picked up keyword is included in the history information.

Subsequently, the preference information including a preference value with respect to a plurality of elements relating to the preference for the content is generated and renewed by the preference information managing means according to the history information.

Subsequently, a preference degree for the content is calculated according to the preference information and the explanation information with respect to the content by the content recommending means and a record reservation of the content is made according to the preference degree. Then, the record reserved content is recorded, so that the content is recorded automatically.

In this way, according to the automatic recording apparatus, the content is recorded automatically according to the plurality of operations relating to the preference for the content. Additionally, when an operation other than the keyword registering operation is performed, a keyword picked up from the explanation information can be included in the history information, so that a keyword relating to the preference for the content is picked up automatically from other than the operation of the keyword registration, and it is possible for the keyword to reflect on the automatic record of the content.

In this way, the content can be recorded automatically in conformity with the complicated and diversified preferences of users according to various operations of users relating to the preferences for the contents.

Next, the present applicant proposes an automatic recording method for content, including generating history information of a plurality of operations relating to a preference for a content and explanation information relating to the content using a preference value parameter for each kind of the plurality of operations; generating and renewing preference information including a preference value with respect to a plurality of elements relating to a preference for the content according to the history information; calculating a preference degree for the content according to the preference information and the explanation information with respect to the content and making a content record reservation according to the preference degree; and recording the content according to the content record reservation.

Further, the present applicant proposes a recording medium recorded with a computer program for executing a process for automatically recording content, the process including generating history information of a plurality of operations relating to a preference for a content and explanation information relating to the content using a preference value parameter for each kind of the plurality of operations; generating and renewing preference information including a preference value with respect to a plurality of elements relating to a preference for the content according to the history information; calculating a preference degree for the content according to the preference information and the explanation information with respect to the content and making a content record reservation according to the preference degree; and recording the content according to the content record reservation.

Further, the present applicant proposes a system for automatic recording of content, the system including a processor operable to execute instructions; and instructions for automatically recording the content, the instructions including generating history information of a plurality of operations relating to a preference for a content and explanation information relating to the content using a preference value parameter for each kind of the plurality of operations; generating and renewing preference information including a preference value with respect to a plurality of elements relating to a preference for the content according to the history information; calculating a preference degree for the content according to the preference information and the explanation information with respect to the content and making a content record reservation according to the preference degree; and recording the content according to the content record reservation.

Further, the present applicant proposes an automatic recording method for content, including generating history information of a plurality of operations relating to a preference for a content and explanation information relating to the content and picking up a keyword from the explanation information by using a keyword dictionary when an operation other than a keyword registering operation is performed so as to include the picked up keyword in the history information; generating and renewing preference information including a preference value with respect to a plurality of elements relating to a preference for the content according to the history information; calculating a preference degree for the content according to the preference information and the explanation information with respect to the content and making a content record reservation according to the preference degree; and recording the content according to the content record reservation.

Further, the present applicant proposes a recording medium recorded with a computer program for executing a process for automatically recording content, the process including generating history information of a plurality of operations relating to a preference for a content and explanation information relating to the content and picking up a keyword from the explanation information by using a keyword dictionary when an operation other than a keyword registering operation is performed so as to include the picked up keyword in the history information; generating and renewing preference information including a preference value with respect to a plurality of elements relating to a preference for the content according to the history information; calculating a preference degree for the content according to the preference information and the explanation information with respect to the content and making a content record reservation according to the preference degree; and recording the content according to the content record reservation.

Further, the present applicant proposes a system for automatic recording of content, the system including a processor operable to execute instructions; and instructions for automatically recording the content, the instructions including generating history information of a plurality of operations relating to a preference for a content and explanation information relating to the content and picking up a keyword from the explanation information by using a keyword dictionary when an operation other than a keyword registering operation is performed so as to include the picked up keyword in the history information; generating and renewing preference information including a preference value with respect to a plurality of elements relating to a preference for the content according to the history information; calculating a preference degree for the content according to the preference information and the explanation information with respect to the content and making a content record reservation according to the preference degree; and recording the content according to the content record reservation.

According to the automatic recording method, the recording medium and the program, the content can be recorded automatically in conformity with the complicated and diversified preferences of users according to various operations of the users relating to the preferences for the contents similar to that explained in connection with the automatic recording apparatus according to the present invention as mentioned above.

BRIEF DESCRIPTION OF THE DRAWINGS

FIG. 3 is a diagram showing a table of a ROM of FIG. 2;

FIG. 4 is a diagram showing a table of a ROM of FIG. 2;

FIG. 5 is a diagram showing a table of a ROM of FIG. 2;

DETAILED DESCRIPTION

An example applied with the present invention to an apparatus for recording and reproducing programs of a digital television broadcast will be explained hereinafter by using drawings.

Figure 1:
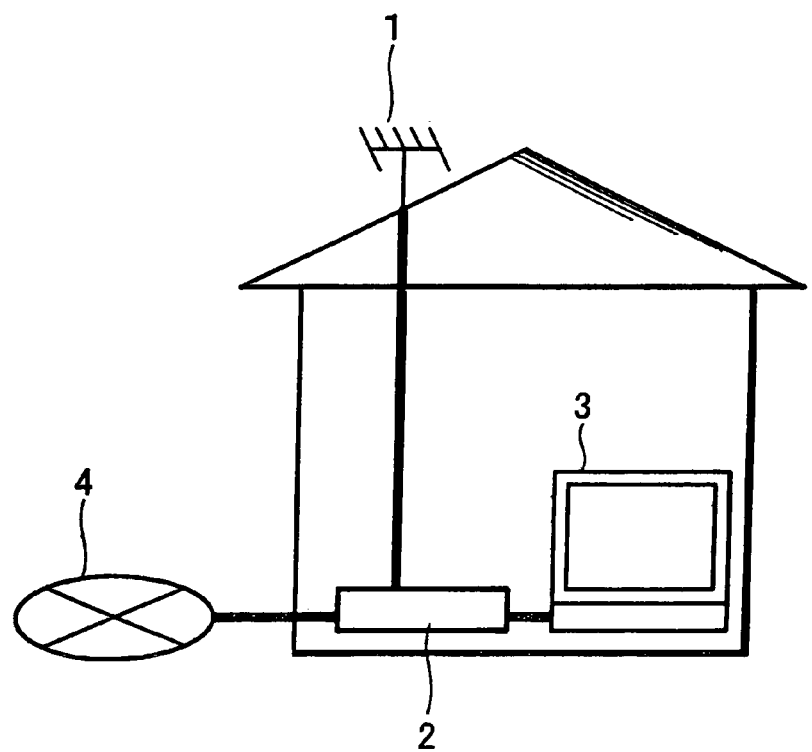
FIG. 1 is a diagram showing an overview of a digital television broadcast receiving system which includes a program recording and reproducing apparatus applied with the present invention.

FIG. 1 is a diagram showing an overview of a digital television broadcast receiving system which includes a program recording and reproducing apparatus applied with the present invention. A digital broadcasting signal transmitted from a television broadcasting station is received by an antenna 1 and inputted to a program recording and reproducing apparatus 2. The program recording and reproducing apparatus 2 is connected to a display device 3 which includes a display and a speaker and is also connected to the Internet 4.

Figure 2:
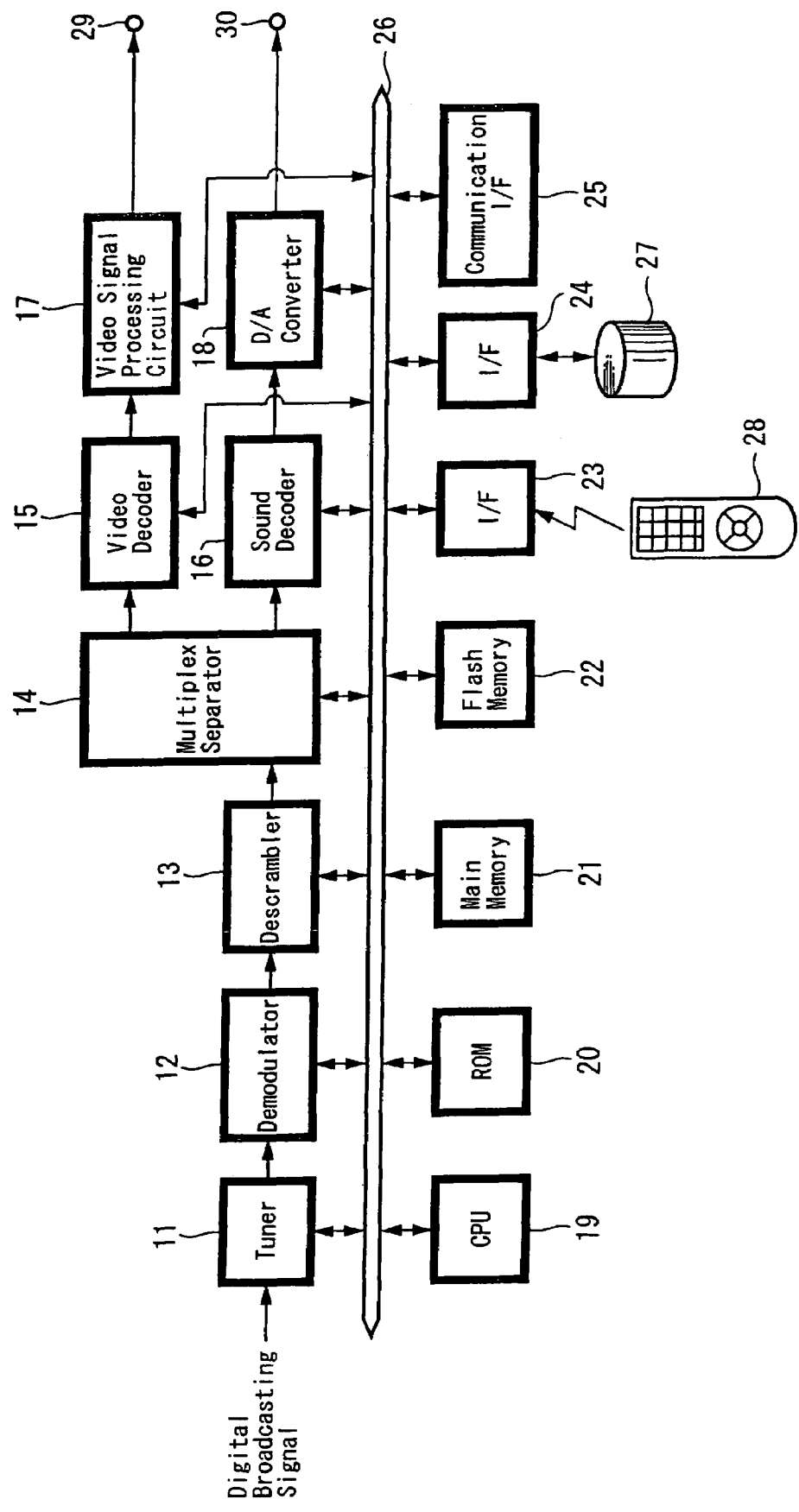
FIG. 2 is a block diagram showing a hardware constitution of a program recording and reproducing apparatus of FIG. 1.

FIG. 2 is a block diagram showing a hardware constitution of the program recording and reproducing apparatus 2. In this program recording and reproducing apparatus 2, a tuner 11, a demodulator 12, a descrambler 13 and a multiplex separator 14 are connected in sequence and at the same time a video decoder 15 and a video signal processing circuit 17 and further, a sound decoder 16 and a D/A converter 18 are respectively connected in sequence with respect to the multiplex separator 14.

Further, the tuner 11 to the D/A converter 18, a CPU 19, a ROM 20, a main memory (RAM) 21, a flash memory 22, an interface 23 for a remote controller, an interface 24 for an HDD (hard disc drive) and a communication interface 25 for an Internet connection are connected one another by means of a system bus 26. An HDD (hard disc drive) 27 for video-recording television programs is connected to the interface 24.

The remote controller (referred as remocon hereinafter) 28 attached to the program recording and reproducing apparatus 2 is provided with a power supply button, a channel selection button, a video-record reservation button, an erase protection button for the video-recorded programs, a video-record reservation cancel button, a reproduction button, a directional key for selecting on the EPG picture screen, a decision key, a keyword registration button and the like.

At the time of viewing and listening to television programs, the digital broadcasting signal inputted to the program recording and reproducing apparatus 2 is frequency band selected in the tuner 11 according to a channel selecting operation of the remocon 28, subsequently demodulated in the demodulator 12, subsequently descrambled from the scramble in the descrambler 13 and separated in the multiplex separator 14 into video and audio data packets of programs for a plurality of channels and/or into EPG information packets.

Video and audio data for 1 channel which was picked up in response to the channel selecting operation of the remocon 28 from the video and audio packets of the television programs for a plurality of channels are decoded in the video decoder 15 and the sound decoder 16 by MPEG-2 Video and MPEG-2 Audio, respectively. Additionally, the EPG information packets are transmitted to the CPU 19.

Then, a video signal decoded in the video decoder 15 and a video signal for an electronic program guide display which is made in the CPU 19 by using EPG information are applied with a conversion to the NTSC system, mixed and the like in the video signal processing circuit 17, outputted from a video output terminal 29 and transmitted to the display device 3 of FIG. 1.

Further, an audio signal decoded in the sound decoder 16 is analog converted in the D/A converter 18, outputted from an audio output terminal 30 and transmitted to the display device 3 of FIG. 1.

The CPU 19 controls the whole of the program recording and reproducing apparatus 2 by using a main memory 21 as a working memory according to programs and/or data stored in the ROM 20.

In the processes which the CPU 19 performs, there is included the same processes (channel selection process, video-recording process according to a video-record reservation, etc.) as in a usual tuner built-in type video deck, a keyword registration process, a program search process according to the registered keywords, etc. and besides, there is included an automatic video-recording process of programs. It should be noted that the video-recording process according to the video-record reservation in the usual processes which the CPU 19 performs will be designated hereinafter as "video-record reservation manager".

FIG. 3 to FIG. 5 show tables stored in the ROM 20 for use in the automatic video-recording process. The operation preference value table of FIG. 3 is a table which has a correspondence respectively to a video-record reserving operation as an operation relating to a program, an erase protecting operation, a video-record reservation canceling operation, a keyword registering operation and an operation preference value parameter, all of which are operations of the remocon 28. The video-record reservation canceling operation includes both a video-record reservation canceling performed by the operation of the remocon 28 and a video-record reservation canceling performed by the automatic video-recording process.

Operation preference value parameters (Pref_operation <manual_rec>, Pref_operation <autodelete_protect>, Pref_operation <recreserve_cancel> and Pref_operation <keyword>) which correspond to the respective operations are set at the time of shipment as concrete numerical values (for example, +6, +3, −6, +3, +3, respectively).

The preference element coefficient table of FIG. 4 is a table in which an element relating to program preference (designated hereinafter as "preference element") included in EPG information, including a title keyword (keyword picked up from title character sequence information in EPG information), a keyword (keyword picked up from detailed character sequence information in EPG information), a genre, a broadcasting time zone (one which discriminates Saturday/Sunday from weekdays) and a broadcast station are shown in correspondence with coefficient parameters, respectively.

The coefficient parameters (Coeff_titlekeyword, Coeff_keyword, Coeff_genre, Coeff_timezone, and Coeff_station) which correspond to the respective preference elements are set with concrete numerical values, respectively, at the time of shipment.

A preference upper-limit value table of FIG. 5 is a table in which each of the preference elements in the preference element coefficient table of FIG. 4 is shown in correspondence with upper-limit value parameters of the preference values, respectively.

The upper-limit value parameters (Upperlim_titlekeyword, Upperlim_keyword, Upperlim_genre, Upperlim_timezone, Upperlim_station) which correspond to the respective preference elements are set with concrete numerical values, respectively, at the time of shipment.

Additionally, a title keyword dictionary and a keyword dictionary are stored in the ROM 20 as dictionaries which are used in the automatic video-recording process.

The title keyword dictionary is a dictionary for picking up a keyword (title keyword) from title character sequence information in the EPG information. A character sequence which is suitable for expressing the preference of users in the character sequences included in program titles, for example, a character sequence which expresses a sub genre (finer genre than a rough genre such as "sport" by genre information in the EPG information) of "professional baseball", "golf", "soccer", "hot springs", "go", "Japanese chess" and the like is registered as a title keyword.

The keyword dictionary is a dictionary for picking up a keyword from detailed character sequence information in the EPG information. A character sequence (performer name, manufacturer name, production place, production date and time, etc.) which is suitable for expressing the preference of users in the character sequences included in detailed character sequence information is registered as a keyword.

It should be noted that the CPU 19 also makes the flash memory 22 store the newest one with respect to the keyword dictionary by downloading it from the site of exclusive use via the Internet.

Further, the CPU 19 makes the flash memory 22 store EPG information packets transmitted from the multiplex separator 14 at the time of the channel selecting operation by users or at the time of the video-recording according to the video-record reserving operation by users on the assumption that the automatic video-recording process is performed.

Figure 6:
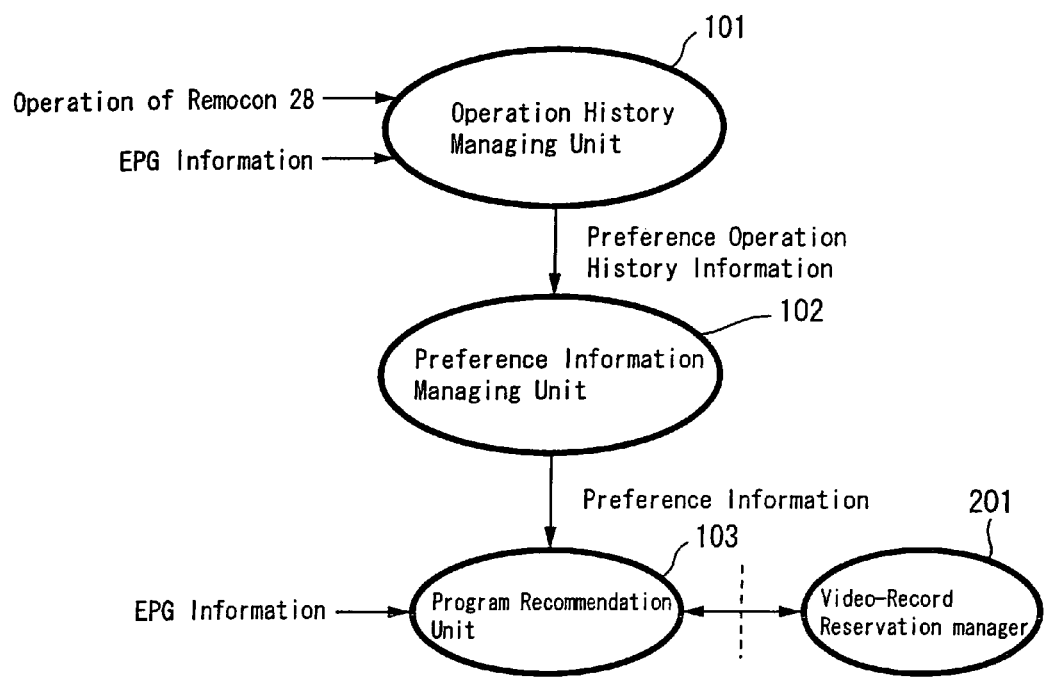
FIG. 6 is a diagram showing a construction of a program for an automatic video-recording process.

FIG. 6 is a diagram showing the construction of a program for the automatic video-recording process. The program is constituted by respective processes of an operation history managing unit 101, a preference information managing unit 102 and a program recommendation unit 103.

The operation history managing unit 101 performs a process for generating history information (designated as "preference operation history information" hereinafter) relating to the program preference by using the operation preference value table (FIG. 3) with respect to the remocon 28 operations (video-record reserving operation, erase protecting operation, video-record reservation canceling operation and keyword registering operation shown in the operation preference value table of FIG. 3) and the EPG information relating to the programs which become objects of these operations.

The preference information managing unit 102 performs a process for generating and renewing the preference information consisting of the preference values relating to the preference elements (title keyword, keyword, genre, broadcasting time zone and broadcast station shown in the preference element coefficient table) included in the EPG information by using the preference element coefficient table (FIG. 4) and the preference upper-limit value table (FIG. 5) according to the preference operation history information generated in the operation history managing unit 101.

The program recommendation unit 103 performs a process for calculating the preference degree relating to a program on the broadcast schedule in the future by using the preference information generated in the preference information managing unit 102 and the EPG information relating to a program on the broadcast schedule in the future, and for performing a video-record reservation with respect to the video-record reservation manager 201 (video-recording process of the CPU 19 according to the aforementioned video-record reservation).

Figure 7:
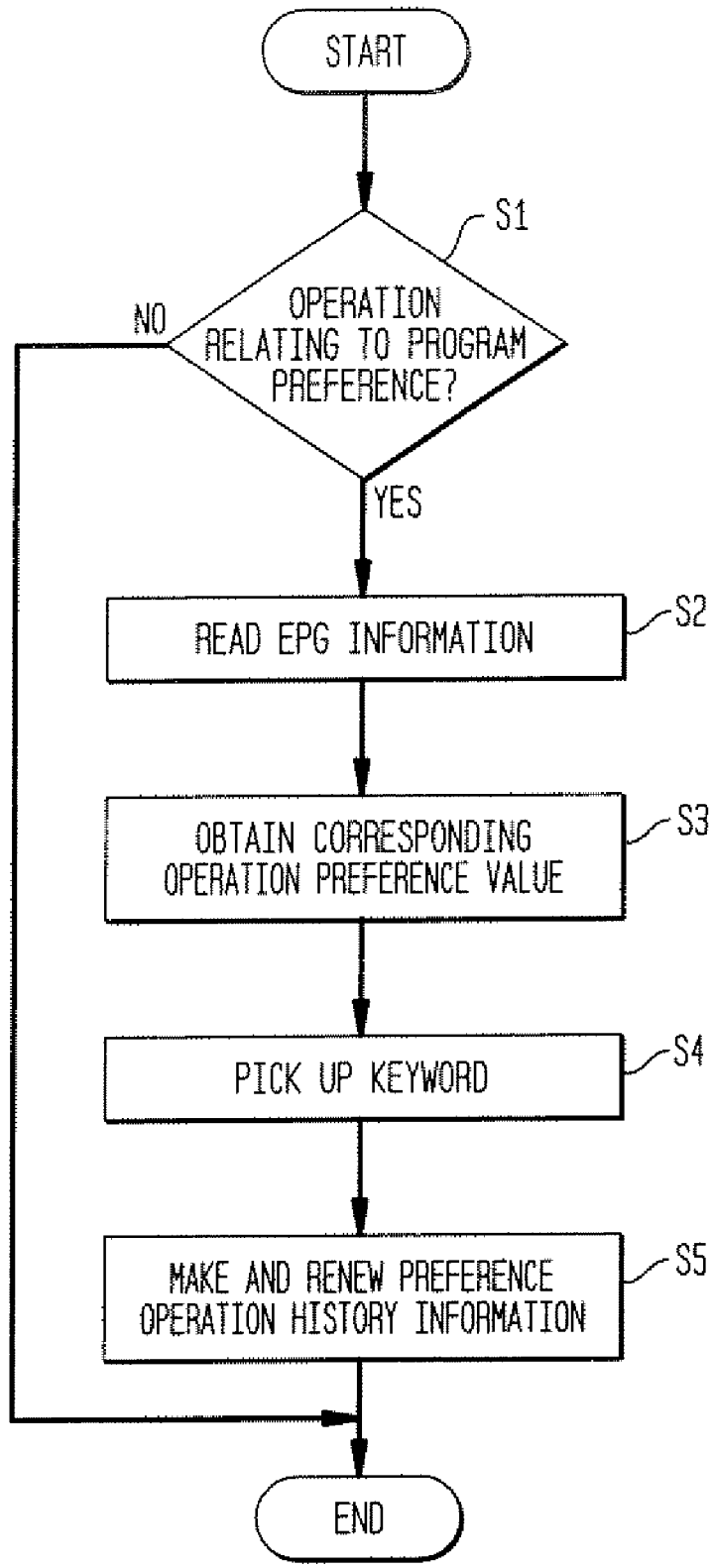
FIG. 7 is a flowchart showing an automatic video-recording process.

FIG. 7 is a flowchart showing a process in the operation history managing unit 101 portion in the automatic video-recording process. The process starts every time the remocon 28 is operated for some purpose and first it is judged whether or not the operation is a kind listed on the operation preference value table (FIG. 3) in the ROM 20 (namely, operation relating to the program preference?) (step S1).

In case of YES, EPG information is read from the flash memory 22 (step S2). Then, the value of the operation preference value parameter corresponding to the operation in the operation preference value table (FIG. 3) (merely designated hereinafter as "operation preference value") is obtained (step S3).

Subsequently, if the operation is an operation other than the keyword registration, the title keyword and the keyword are picked up by using the aforementioned title keyword dictionary and keyword dictionary, respectively, with reference to the title character sequence information and the detailed character sequence information in the EPG information relating to the program which becomes an object of that operation (step S4).

Then, preference operation history information consisting of the items listed hereinafter is generated and stored in the flash memory 22 (step S5).

operation ID operation preference value obtained in step S3 broadcast station ID, program broadcast date, program broadcast start time, program broadcast ending time, genre ID, title character sequence information and detailed character sequence information included in the EPG information relating to the program which becomes an object of that operation title keyword list and keyword list listing up title keywords and keywords picked up in step S4, respectively However, if the keyword registering operation is performed, preference operation history information consisting of only the operation ID and the preference value obtained in step S3 is generated in step S5.

The process is finished when step S5 ends. Further, in case of NO in step S1, the process will be finished at once.

Figure 8:
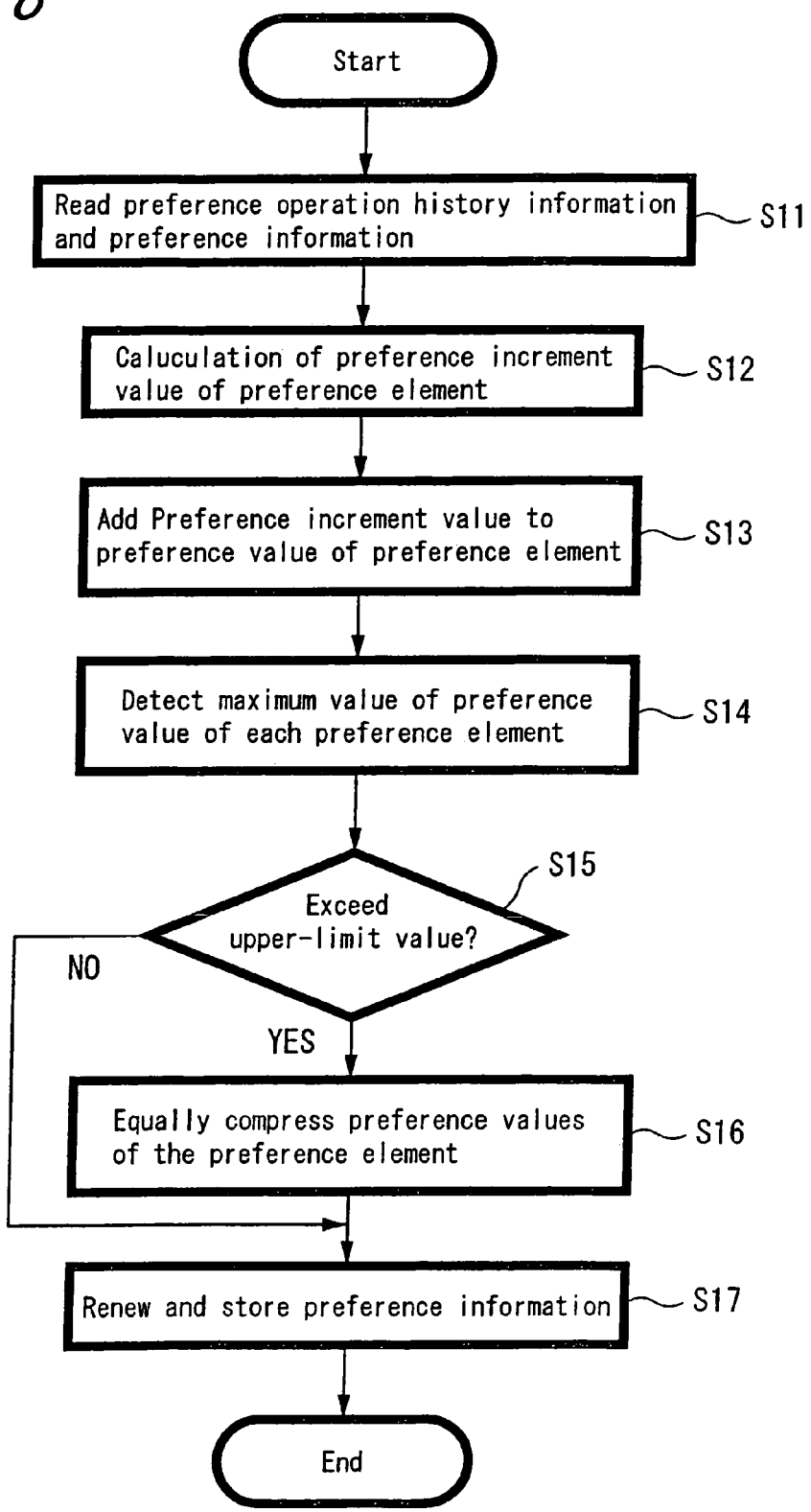
FIG. 8 is a flowchart showing an automatic video-recording process.

FIG. 8 is a flowchart showing a process in the preference information managing unit 102 (FIG. 6) portion of the automatic video-recording process.

As mentioned above, the preference information managing unit 102 performs a process for generating and renewing the preference information which is constituted by items listed hereinafter.

combined information of the title keyword, preference value (Pref_titlekeyword) relating to the title keyword, and renewal date and time for every individual and concrete title keyword combined information of the keyword, preference value (Pref_keyword) relating to the keyword, and renewal date and time for every individual and concrete keyword combined information of the genre, preference value (Pref_genre) relating to the genre, and renewal date and time for every individual and concrete genre combined information of the broadcasting time zone, preference value (Pref_timezone) relating to the broadcasting time zone, and renewal date and time for every individual and concrete broadcasting time zone combined information of the broadcast station, preference value (Pref_station) relating to the broadcast station, and renewal date and time for every individual and concrete broadcast station It should be noted that there is provided a limitation of, for example, 100 words for each of the total numbers of the title keywords and keywords which are included in the preference information.

Additionally, the genre classification for the preference information complies with the genre classification (sport, drama, etc.) for the EPG information. However, with respect to the programs which are classified into "others" for the genre in the EPG information, it is possible to create a new genre which does not exist in the EPG information according to the title keyword picked up from the title of the program (for example, when a genre of news does not exist in the EPG information and further when "NEWS in Japanese characters", "NEWS" or N-character with a parenthesis is picked up from a title as a title keyword, a genre named news is created).

Further, the broadcasting time zone is classified for the preference information such as, for example, 5 o'clock to 10 o'clock, 10 o'clock to 17 o'clock, 17 o'clock to 24 o'clock and 0 o'clock to 5 o'clock.

The operation of FIG. 8 starts every time the preference operation history information of one operation is stored in the flash memory 22 by the process of FIG. 7. First, the preference operation history information and the preference information at the present time are read from the flash memory 22 (step S11).

Then, preference increment values with reference to the title keyword, the keyword, the genre, the broadcasting time zone and the broadcast station, which are the preference elements listed in the preference element coefficient table in the ROM 20 (FIG. 4), are calculated according to the preference operation history information (step S12).

The calculation of the preference increment value relating to the title keyword (Increment titlekeyword) among the preference elements is performed according to the following equation for every individual and concrete title keyword listed in the title keyword list in the preference operation history information:

Increment titlekeyword=Pref_operation×Coeff_title-keyword/(N titlekeyword)M

Additionally, the calculation of the preference increment value relating to the keyword (Increment keyword) is performed according to the following equation for every individual and concrete keyword listed in the keyword list in the preference operation history information:

Increment keyword=Pref_operation×Coeff_keyword/(N keyword)M

Further, the calculation of the preference increment value relating to the genre (Increment genre) is performed according to the following equation for every individual and concrete genre specified by the genre ID in the preference operation history information:

Increment genre=Pref_operation×Coeff_genre

Further, the calculation of the preference increment value relating to the broadcasting time zone (Increment timezone) is performed according to the following equation for every individual and concrete broadcasting time zone (any one of 5 o'clock to 10 o'clock, 10 o'clock to 17 o'clock, 17 o'clock to 24 o'clock and 0 o'clock to 5 o'clock) specified by the program broadcast date, the program broadcast start time and the program broadcast ending time in the preference operation history information:

Increment time-zone=Pref_operation×Coeff_timezone

Further, the calculation of the preference increment value relating to the broadcast station (Increment station) is performed according to the following equation for every individual and concrete broadcast station specified by the broadcast station ID in the preference operation history information:

Increment station=Pref_operation×Coeff_station

In these calculation equations, the Pref_operation is an operation preference value in the preference operation history information. Further, the Coeff_titlekeyword, the Coeff_keyword, the Coeff_genre, the Coeff_timezone and the Coeff_station are coefficient parameters corresponding to the title keyword, the keyword, genre, the broadcasting time zone and the broadcast station, respectively, in the preference element coefficient table (FIG. 4).

Further, the N titlekeyword and N keyword in the calculation equation of the preference increment value relating to the title keyword and the keyword are numbers of the title keyword and the keyword listed in the title keyword list and the keyword list, respectively, in the preference operation history information. Additionally, M is set to one of 0, 0.5 and 1 (for example, 0.5) at the time of shipment.

Further, in the calculation equation of the preference increment value relating to the title keyword and the keyword, division by (N title keyword)M and (N keyword)M, respectively, is performed so as to standardize the calculated result (to suppress a big difference in the calculation result which may happen depending upon the amount of numbers of the title keyword and the keyword).

It should be noted that if the preference operation history information consists only of the operation ID and the operation preference value (more specifically, in the case of the preference operation history information being made according to the keyword registering operation), the calculation of the preference increment values relating to the genre, the broadcasting time zone and the broadcast station is not performed in step S12 and these preference increment values remain at zero.

Subsequently, the present preference value with respect to these preference elements is added to the preference increment value calculated in step S12 so as to calculate a new preference value (step S13).

More specifically, for each individual and concrete title keyword with reference to the title keywords, the preference value Pref_titlekeyword with respect to the title keyword in the present preference information (expressed as Pref_titlekeyword (old) in the following equation) is added to the preference increment value Increment titlekeyword calculated relative to its title keyword in step S12 so as to calculate a new preference value Pref_titlekeyword as shown in the following equation:

Pref_titlekeyword=Increment titlekeyword+Pref_titlekeyword(old)

Additionally, for each individual and concrete keyword with reference to the keywords, the preference value Pref_keyword with respect to the keyword in the present preference information (expressed as Pref_keyword (old) in the equation below) is added to the preference increment value Increment keyword calculated relative to its keyword in step S12 so as to calculate a new preference value Pref_keyword as shown in the following equation:

Pref_keyword=Increment keyword+Pref_keyword (old)

Further, for each individual and concrete genre (news, drama, etc.) with reference to the genres, the preference value Pref_genre with respect to the genre in the present preference information (expressed as Pref_genre (old) in the following equation) is added to the preference increment value Increment genre calculated relative to its genre in step S12 so as to calculate a new preference value Pref_genre as shown in the following equation:

Pref_genre=Increment genre+Pref_genre(old)

Further, for each individual and concrete broadcasting time zone (5 o'clock to 10 o'clock, 10 o'clock to 17 o'clock, 17 o'clock to 24 o'clock and 0 o'clock to 5 o'clock) with reference to the broadcasting time zones, the preference value Pref_timezone with respect to the broadcasting time zone in the present preference information (expressed as Pref_timezone (old) in the following equation) is added to the preference increment value Increment timezone calculated relative to its broadcasting time zone in step S12 so as to calculate a new preference value Pref_timezone as shown in the following equation:

Pref_timezone=Increment timezone+Pref_timezone (old)

Furthermore, for each individual and concrete broadcast station with reference to the broadcast stations, the preference value Pref_station with respect to the broadcast station in the present preference information (expressed as Pref_station (old) in the following equation) is added to the preference increment value Increment station calculated relative to its broadcast station in step S12 so as to calculate a new preference value Pref_station as shown in the following equation:

Pref_station=Increment station+Pref_station(old)

Here, when preference increment values relating to new title keywords or keywords which are not included in the present preference information are calculated in step S12, the new title keywords or keywords and their preference values become new constitutional elements of the preference information in step S13 by making those preference increment values to be new preference values.

Further, if the total number of the title keywords or the keywords in the preference information exceed the aforementioned limitation (for example, number of 100) by making the new title keyword or keyword to be new preference elements in the preference information, firstly a necessary number of title keywords or keywords which have preference values equal to or less than a predetermined value are cancelled in the order of the older renewed date with respect to the title keywords or keywords in the present preference information. Thereafter, the new title keywords or keywords are made to be new preference elements in the preference information.

Subsequently, the maximum value of the new preference values which are obtained in step S13 is detected relative to each preference element (title keyword, keyword, genre, broadcasting time zone or broadcast station) (step S14).

Then, it is judged whether or not the maximum value exceeds the value of the upper-limit value parameter (merely designated as "upper-limit value" hereinafter) which corresponds to the preference element in the preference upper-limit value table (FIG. 5) (step S15).

If YES, a value obtained by equally compressing all the preference values (including preference values relating to the title keywords or the keywords newly made to be constitutional elements of the preference information in step S13 with reference to the title keywords or keywords) relating to the preference elements in the present preference information is set as a new preference value relating to the preference element (step S16).

More specifically, for example, when the preference value relating to sports in the genres exceeds the upper-limit value, the preference values relating to all of the concrete genres such as sports and dramas in the present preference information are equally compressed in step S16.

This compression is carried out according to the following equation (preference value before compression is designated as preference value (old) in the following equation):

preference value=preference value(old)×upper-limit value/maximum value

After ending step S16, the process proceeds to step S17. Additionally, in case of "NO" in step S15, the process proceeds directly from step S15 to step S17.

In step S17, the present preference information is renewed by using the process result so far (change of renewal date and time is also carried out) and the renewed preference information is stored in the flash memory 22 instead of the present preference information. When step S17 ends, the process is ended.

When the process of FIG. 8 is performed for the first time, the preference information does not exist, so that new preference information is made and stored in the flash memory 22. Then, the preference information is renewed after the second time and every time the process of FIG. 8 is performed.

It should be noted that it is possible to start the process of FIG. 8 every time the preference operation history information of a predetermined number of operations is stored in the flash memory 22, every time a certain time period elapses and the like, instead of starting it every time the preference operation history information of one operation is stored in the flash memory 22. In this case, it is enough to perform the preference information generating and renewing in gross according to all the preference operation history information which is newly stored in the flash memory 22 after the proximate process of FIG. 8 is ended.

Figure 9:
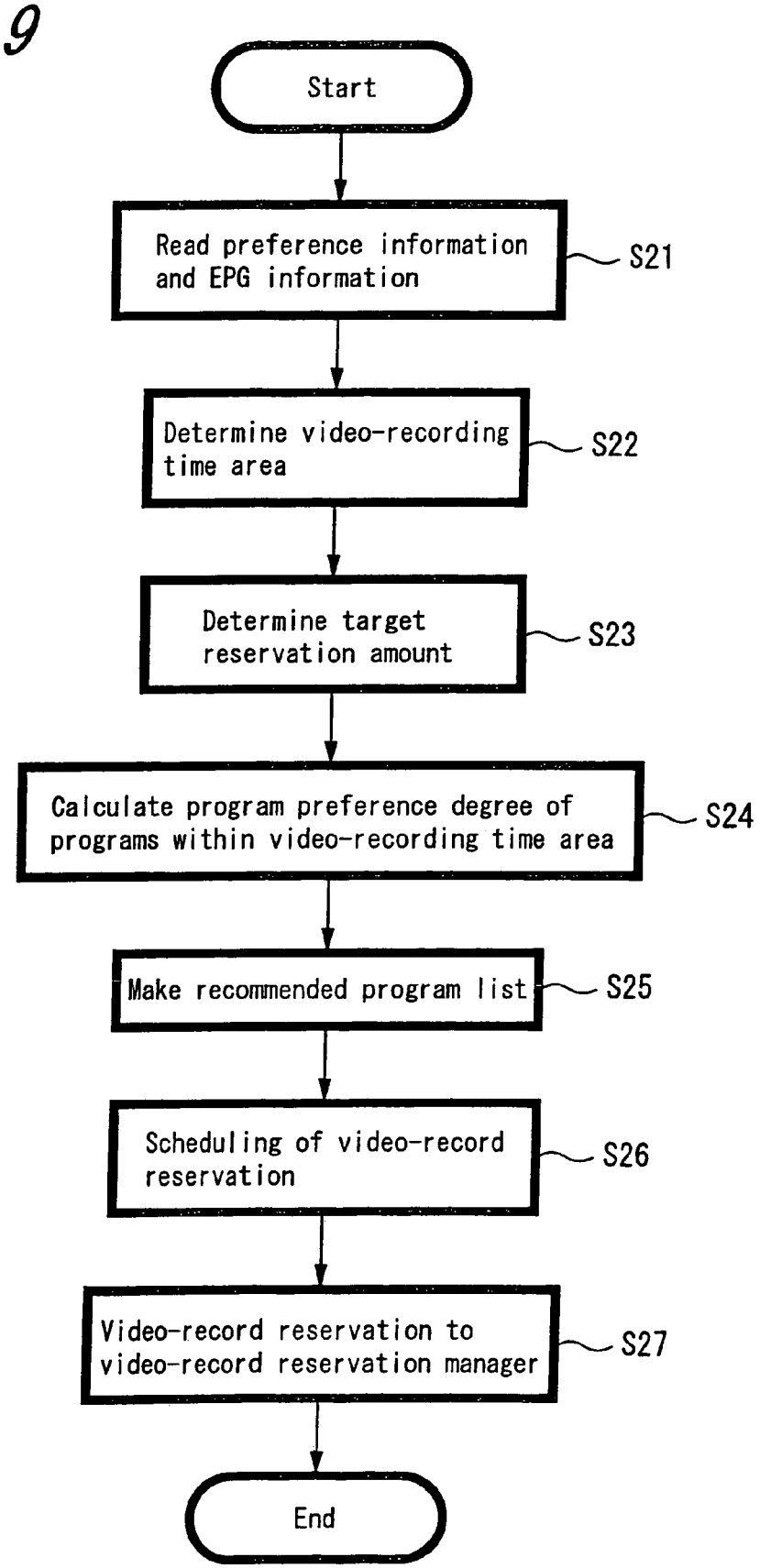
FIG. 9 is a flowchart showing an automatic video-recording process.

FIG. 9 is a flowchart showing a process of the program recommendation unit 103 portion in the automatic video-recording process. This process starts periodically (for example, starts once a day, at a predetermined time or just after new EPG information is received) and firstly reads preference information and EPG information from the flash memory 22 (step S21).

Subsequently, an area of a broadcasting period of the program (designated as "video-recording time area" hereinafter) which is reserved for a video-recording by the process this time is determined. (step S22). When this process is started, for example, at a predetermined time once a day, 24 hours from that time until the same time next day is determined in step S22 as a video-recording time area.

Subsequently, a program amount (designated as "target reservation amount") to be reserved for video-recording in this process this time is determined (step S23).

As this determining method, firstly the target reservation amount per 24 hours is set to the larger of A % with respect to the vacant capacity of the HDD 27 (FIG. 2) and B % with respect to the non-protected region of the HDD 27 (region which is not erase protected though the programs are video-recorded) (the concrete values of A and B are set at the time of shipment according to the maximum admissible amount of the programs to be automatically video-recorded).

Then, assuming that the video-recording time area determined in step S22 is C hours, the target reservation amount for those 24 hours is multiplied by C/24 so as to be a target reservation amount.

Figure 10A:
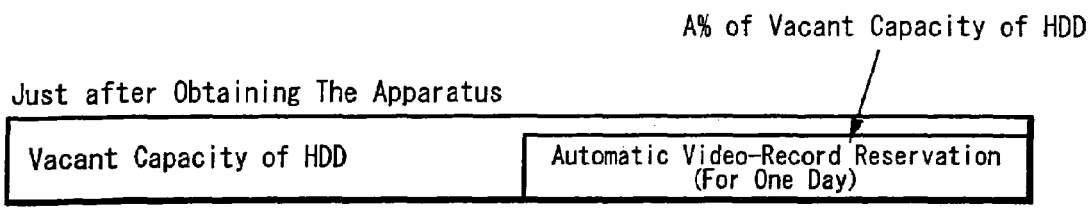
FIGS. 10A to 10C are diagrams showing target reservation amounts.
Figure 10B:
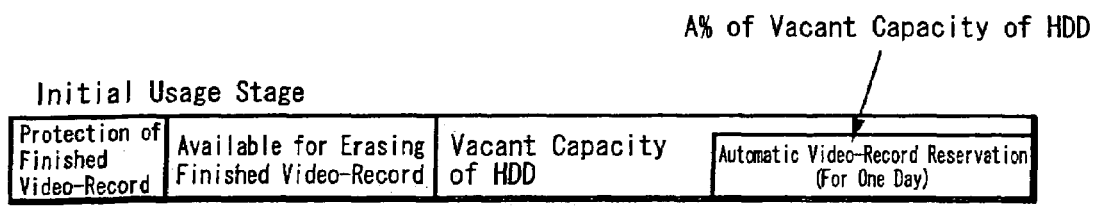
Figure 10C:
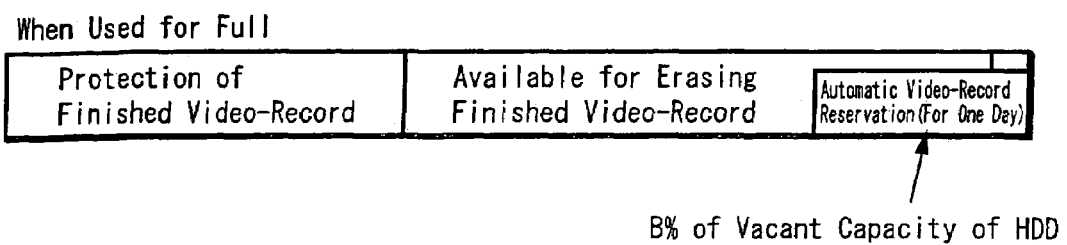

The target reservation amount is determined according to such a method in order to, as shown in FIG. 10, make it possible to video-record a lot of programs automatically by making the scheduled amount large when the vacant capacity of the HDD 27 is large (FIG. 10A), such as just after the program recording and reproducing apparatus 2 is obtained by a user, and on the other hand, in order to make it possible to video-record a constant amount of programs automatically without a big change happening in the target scheduled amount when the vacant capacity of the HDD 27 is decreased (FIG. 10B), such as a time of the initial usage stage of the program recording and reproducing apparatus 2 or when the vacant capacity of the HDD 27 approaches zero (FIG. 10C).

Here, since the length of a broadcast period of each program fluctuates, the target reservation amount is made to have a width of ±D hours (the concrete value of D is also set at the time of shipment).

Subsequently, EPG information relating to programs having a broadcast starting time within the range of the video-recording time area determined in step S22 are selected from the EPG information which was read in step S21 and the program preference degree relating each of these programs is calculated (step S24).

More specifically, according to the title character sequence information and the detailed character sequence information relating to the program in the EPG information, the title keyword and the keyword listed in the title keyword list and the keyword list, respectively, in the preference information which was read in step S21 are searched for. At that time, it is also possible to search for a character sequence relating to the title keyword and the keyword (for example, abbreviated names or nicknames of celebrities) by using a thesaurus dictionary (newest one downloaded via Internet) which is a dictionary for picking up resemblance words.

Then, when the title keyword is detected, the preference value (Pref_titlekeyword) relating to the title keyword in the preference information is added to the program preference degree (Pref_progRAM) with respect to the program for every title keyword detected.

Additionally, when the keyword is detected, the preference value (Pref_keyword) relating to the keyword in the preference information is added to the program preference degree (Pref_progRAM) with respect to the program for every keyword detected.

Further, the genre is discriminated according to the genre ID relating to the program in the EPG information and the preference value (Pref_genre) relating to the genre in the preference information is added to the program preference degree (Pref_progRAM).

Further, the broadcasting time zone is discriminated according to the information relating to the program broadcast date, the program broadcast start time and the program broadcast ending time and the preference value (Pref_timezone) relating to the time zone in the preference information is added to the program preference degree (Pref_progRAM).

Finally, the broadcasting station is discriminated according to the information relating to the broadcasting station relating to the program in the EPG information and the preference value (Pref_station) relating to the broadcasting station in the preference information is added to the program preference degree (Pref_progRAM).

When the calculating method is expressed as an equation, it becomes the following equation:

$$\text{Pref\_progRAM} = \Sigma \text{Pref\_titlekeyword} + \Sigma \text{Pref\_keyword} + \text{Pref\_genre} + \text{Pref\_timezone} + \text{Pref\_program}$$

(Here, Pref_titlekeyword and Pref_keyword relate only to the detected title keywords and keywords, respectively.)

Subsequently, a recommended program list is made in which the broadcast starting times within the video-recording time area are arranged in order of their program preference degrees calculated in step S24 (step S25).

Then, a scheduling of a video-record reservation of the programs for a target reservation amount determined in step S23 is performed in the order of the programs listed in the recommended program list, beginning with the programs having the higher program preference degree (step S26).

It should be noted that the scheduling in step S26 is performed such that the video-recording time zones of the plurality of programs are not doubled. Further, when the program preference degrees of a plurality of programs listed in the recommended program list are equal to one another, the order of the programs are determined at random in step S26.

Subsequently, a video-record reservation is performed with respect to the video-record reservation manager according to this scheduling (step S27). When step S27 is ended, the process is ended.

In the video-record reservation manager, the programs which are video-record reserved by this automatic video-recording process are video-recorded similarly to the programs which are video-record reserved by the video-record reserving operation of the remocon 28.

Additionally, the programs which are video-record reserved by this automatic video-recording process are also displayed by the video-record reservation manager on the display device 3 as a usual video-record reservation program list similarly to the programs which are video-record reserved by the video-record reserving operation of the remocon 28, and the video-record reservation can be cancelled by a video-record canceling operation of the remocon 28. In the canceling operation of the video-record reservation relating to the operation preference value table (FIG. 3), the canceling operation relating to the programs which are video-record reserved by the automatic video-recording process is included.

Next, the aspect of the program being recorded in the program recording and reproducing apparatus 2 will be explained. When users perform a video-record reserving operation, an erase protecting operation, a video-record reservation canceling operation or a keyword registering operation by the remocon 28, the preference operation history information is generated by the process of FIG. 7 (by the preference operation history managing unit 101 of FIG. 6) according to those operations and the EPG information relating to the programs which become the target of those operations and by using the operation preference value table (FIG. 3).

Further, when operations other than the keyword registering operation are performed, a keyword is picked up from the EPG information by the process of FIG. 7 and the picked up keyword is included in the preference operation history information.

Subsequently, the preference information consisting of the preference values relating to respective preference elements such as the title keyword, the keyword, the genre, the broadcasting time zone and the broadcast station are generated and renewed according to the preference operation history information by the process of FIG. 8 (by the preference information managing unit 102 of FIG. 6) using the preference element coefficient table (FIG. 4).

Additionally, when any one preference element of these preference elements includes a preference value which exceeds the upper-limit value in the preference upper-limit value table (FIG. 5), all the preference values relating to the preference elements are equally compressed by the process of FIG. 8.

Subsequently, the preference degree with reference to the program is calculated by the process of FIG. 9 (by the program recommendation unit 103 of FIG. 6) using the preference information and the EPG information and a program recording reservation is performed according to its preference degree. Then, the record reserved content will be recorded, so that the content is automatically recorded.

In this way, according to the program recording and reproducing apparatus 2, the programs can be recorded according to the multiple kinds of operations relating to the program preferences.

Further, as the preference operation history information is generated by using the preference value parameters (preference value parameters in the operation preference value table of FIG. 3) for respective kinds of operations, it is possible to arbitrarily set and change the reflection degree of various kinds of operations (video-record reserving operation, erase protecting operation, video-record reservation canceling operation and keyword registering operation) with respect to the automatic recording of the programs by setting and changing those preference value parameters.

Further, the keywords picked up from the explanation information are included in the history information when an operation other than the keyword registering operation is performed, so that it is possible to automatically pick up the keywords relating to the content preference by an operation other than the keyword registering operation such that the keywords are reflected on the automatic recording of the content.

In this way, it is designed such that the programs can be automatically recorded in conformity with the complicated and diversified preferences of users according to the users' various operations relating to the program preference.

Moreover, the preference information is made and renewed by using the respective coefficient parameters (coefficient parameters on the operation element coefficient table in FIG. 4) of the preference elements, so that it is possible to arbitrarily set and change the reflection degree of each preference element (title keyword, keyword, genre, broadcasting time zone or broadcast station) with respect to the automatic record of the programs by setting and changing these coefficient parameters.

Additionally, all preference values relating to the preference elements which include the preference values exceeding the upper-limit value are equally compressed, so that the preference values relating to the preference elements which include the preference values exceeding the upper-limit value in the preference information will have higher specific gravities of the preference values according to the users' operation thereafter (the specific gravities of the former preference values become conversely smaller). Accordingly, it is designed such that programs in conformity with the users' preference at present can be automatically recorded in response to changes in the users' preference over time.

It should be noted in the above-mentioned example that four kinds of operations, namely, a video-record reserving operation, an erase protecting operation, a video-record reservation canceling operation and a keyword registering operation, are listed on the operation preference value table (FIG. 3) as operations relating to the program preference. However, it is possible to list various operations other than those above, such as a video-recording operation, a viewing and listening operation, a viewing and listening reservation operation, an erase operation of a program which was video-recorded, a reproducing operation of a program which was video-recorded, a volume adjusting operation, a channel selecting operation at the time of viewing and listening and a changing over operation of a program which is the reproducing object at the time of reproducing (the preference operation history information is also generated from those operations).

Further, in the above example, the title keyword, the keyword, the genre, the broadcasting time zone and the broadcast station are listed as the preference elements on the preference element coefficient table (FIG. 4). However, it is possible to also list other elements such as program names (titles), categories, and channels as the preference elements (the preference values relating to these preference elements are also included in the preference information).

Additionally, in the above example, the value of the operation preference value parameter on the operation preference value table (FIG. 3), the value of the coefficient parameter on the preference element coefficient table (FIG. 4) and the value of the upper-limit value parameter on the preference upper-limit value table (FIG. 5) are respectively set at the time of shipment.

However, it is possible to adopt a constitution as another example where users can set and change these parameters arbitrarily by, for example, providing an operation button on the remocon 28 for variably setting these parameters.

In this way, it becomes possible for users to set and change these parameters according to their own operational inclination, the preference elements which they themselves give weight to and the like such that programs which are more in conformity with their preference can be automatically video-recorded.

Additionally, in the above example, the preference information made by the process of FIG. 8 and the recommended program list made by the process of FIG. 9 are only information for the internal process of the CPU 19.

However, it is possible to adopt a constitution as another example where users can confirm the contents of the preference information and the recommended program list by, for example, providing an operational button on the remocon 28 for outputting the preference information and recommended program list as video data (displaying a picture on the display device 3).

Furthermore, it is also possible to provide an operational button on the remocon 28 for erasing the preference information which was confirmed or to adopt a constitution where users can reserve the video-recording of the programs listed on the confirmed recommended program list by the operation of the remocon 28 (the video-record reserving operation relating to the programs listed on the recommended program list is included in the video-record reserving operation with respect to the operation preference value table of FIG. 3).

Further, in the above example, the present invention is applied to an apparatus for recording and reproducing programs of digital television broadcasting. However, it is needless to say that the present invention is not limited by this and can also be applied to a program recording and reproducing apparatus for recording and reproducing programs of analog television broadcasting.

Figure 11:
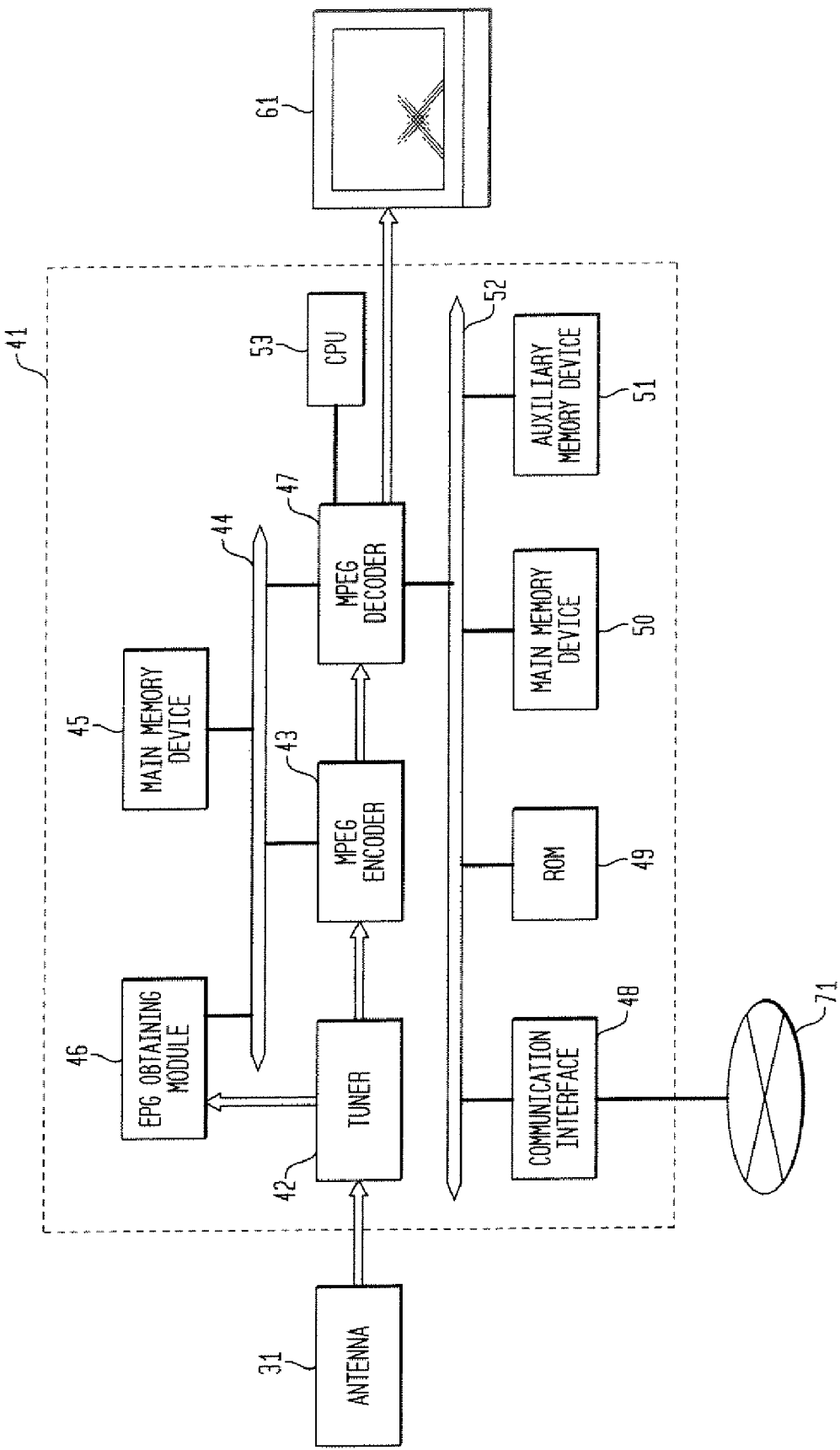
FIG. 11 is a block diagram showing a hardware constitution of a program recording and reproducing apparatus for an analog television broadcast applied with the present invention.

FIG. 11 is a block diagram showing a hardware constitution of a program recording and reproducing apparatus for analog television broadcasting applied with the present invention. A video and audio signal in an analog broadcast signal which is received by an antenna 31 and inputted to a program recording and reproducing apparatus 41 is frequency band selected in a tuner 42 and encoded in an MPEG encoder 43.

At the time of viewing and listening to the television programs, the encoded video and audio data are decoded in an MPEG decoder 47 and transmitted to a display device 61 from the program recording and reproducing apparatus 41.

On the other hand, at the time of recording the television programs, the video and audio data encoded in the MPEG encoder 43 is transmitted to a main memory device 45 through a bus 44 and recorded in the main memory device 45.

Then, at the time of reproducing, the video and audio data read out from the main memory device 45 are transmitted to the MPEG decoder 47 through the bus 44 so as to be decoded in the MPEG decoder 47 and transmitted to the display device 61 from the program recording and reproducing apparatus 41.

Additionally, EPG information is obtained in an EPG obtaining module 46 from an analog broadcast signal which is frequency band selected in the tuner 42. This EPG information is also transmitted to the main memory device 45 through the bus 44 and stored in the main memory device 45.

Further, a communication interface 48 for connecting with the Internet 71, a ROM 49, a main memory device 50, an auxiliary memory device 51 and the MPEG decoder 47 are connected to one another by means of a bus 52.

In this program recording and reproducing apparatus 41, an operation preference value table (FIG. 3) as mentioned above, a preference element coefficient table (FIG. 4), a preference upper-limit value table (FIG. 5), a title keyword dictionary and a keyword dictionary are stored in the ROM 49 (with respect to the keyword dictionary, the newest one is downloaded from the site for exclusive use through the Internet and stored in the auxiliary memory device 51). At the same time, a CPU 53 which controls the whole of the program recording and reproducing apparatus 41 performs the same automatic video-recording process as shown in FIG. 6 to FIG. 9 in addition to the same processes as those in a usual tuner built-in type video deck (channel selection process, video-recording process according to the video-record reservation and the like (by means of the operation of the remocon or the like whose illustration is omitted), keyword registration process, program search process according to the registered keywords and the like).

In this program recording and reproducing apparatus 41, it is also possible to automatically record programs in conformity with a users' complicated and diversified preferences according to the users' various operations relating to program preferences similarly to that explained with reference to the program recording and reproducing apparatus 2 of FIG. 1 and FIG. 2. At the same time, it is possible to record programs automatically in conformity with the users' preference at present in response to changes in the users' preference over time.

Further, in the above example, the present invention is applied to a program recording and reproducing apparatus where a display device is provided separately therewith. However, the present invention is not limited by this configuration and can be applied to a television receiver in which the program recording and reproducing apparatus and the display device are formed together in a single body configuration.

Further, in the above example, the present invention is applied in order to video-record television programs automatically. However, the present invention is not limited by this application and can be applied for an automatic recording of contents (for example, contents distributed by means of the Internet) other than television programs. When contents distributed by means of the Internet are recorded automatically, it is desirable to list content names (titles), keywords, genres, categories, registered dates and hours on the Internet site, names for the Internet site, addresses for the Internet site and the like as preference elements in the preference element coefficient table.

Further, it is needless to say that the present invention is not limited by the above examples and various other constitutions can be adopted without departing from the concept thereof.

As mentioned above, according to the present invention, an effect can be obtained such that contents such as television programs can be recorded automatically in conformity with a users' complicated and diversified preferences according to various users' operations relating to content preferences.

Further, another effect can also be obtained such that the reflection degrees of the respective elements (for example, keywords, genres, distribution time zones of the contents, distributing agencies of the contents) with respect to the automatic recording of the contents can be set and changed arbitrarily.

Furthermore, an effect can also be obtained such that contents in conformity with a users' preferences at present can be recorded automatically in response to the user's change in preference over time.

The invention claimed is:

1. An apparatus for automatic recommending of content, comprising:

preference operation history managing means for generating preference operation history information from a plurality of operations that is performed on particular content and that relates to preferences for the content and from a plurality of explanation information relating to the content, the preference operation history information being generated using a plurality of operation preference value parameters that correspond to a plurality of kinds of operations associated with the plurality of operations;

preference information managing means for generating and renewing preference information that includes a plurality of preference values corresponding to a plurality of preference elements relating to the preferences for the content, the plurality of preference values being determined based on the preference operation history information; and content recommending means for calculating a preference degree relating to the content using the generated and renewed preference information and the plurality of explanation information relating to the content, and for recommending a specific portion of the content based on the preference degree.

2. An apparatus according to claim 1, wherein the plurality of operations include a record reservation operation for the content, an erase protecting operation for the content, and a keyword registering operation for searching the content.

3. An apparatus according to claim 2, wherein the preference operation history managing means picks up a keyword from the explanation information by using a keyword dictionary and includes the picked up keyword in the history information when an operation other than the keyword registering operation is performed.

4. An apparatus according to claim 1, wherein the preference information managing means generates and renews the preference information by using a coefficient parameter for each of the plurality of elements.

5. An apparatus according to claim 1, wherein the plurality of elements include a keyword, a genre, a content distribution time zone and a content distributing agency.

6. An apparatus according to claim 5, wherein a number of keywords included in the plurality of elements has a limitation and when the limitation is exceeded, at least one keyword having a preference value equal to or less than a predetermined value is deleted from the plurality of elements.

7. An apparatus according to claim 1, wherein the preference information managing means equally compresses all of the preference values relating to the elements included in the plurality of elements, including preference values which exceed a predetermined upper-limit value.

8. An apparatus according to claim 1, wherein the content recommending means makes a content record reservation for contents based on a size of vacant regions of the recording apparatus and a size of the preference degree for each of the contents.

9. An apparatus according to claim 1, wherein the content recommending means includes means for scheduling a content record reservation for the recommended portion of the content, the recommended portion of the content being recorded according to the content record reservation.

10. An automatic content recommending method, comprising:
providing a processor that carries out the following steps:
generating preference operation history information from a plurality of operations that is performed on particular content and that relates to preferences for the content and from a plurality of explanation information relating to the content, the preference operation history information being generated using a plurality of operation preference value parameters that correspond to a plurality of kinds of operations associated with the plurality of operations,
generating and renewing preference information that includes a plurality of preference values corresponding to a plurality of preference elements relating to the preferences for the content, the plurality of preference values being determined based on the preference operation history information, and
calculating a preference degree relating to the content using the generated and renewed preference information and the plurality of explanation information relating to the content, and recommending a specific portion of the content based on the preference degree.

11. A recording medium recorded with a computer program for executing a process for automatically recommending content, the process comprising:
generating preference operation history information from a plurality of operations that is performed on particular content and that relates to preferences for the content and from a plurality of explanation information relating to the content, the preference operation history information being generated using a plurality of operation preference value parameters that correspond to a plurality of kinds of operations associated with the plurality of operations;
generating and renewing preference information that includes a plurality of preference values corresponding to a plurality of preference elements relating to the preferences for the content, the plurality of preference values being determined based on the preference operation history information; and
calculating a preference degree relating to the content using the generated and renewed preference information and the plurality of explanation information relating to the content, and recommending a specific portion of the content based on the preference degree.

12. A system, comprising:
a processor operable to execute instructions; and
instructions for executing a process for automatically recommending content, the instructions including:
generating preference operation history information from a plurality of operations that is performed on particular content and that relates to preferences for the content and from a plurality of explanation information relating to the content, the preference operation history information being generated using a plurality of operation preference value parameters that correspond to a plurality of kinds of operations associated with the plurality of operations,
generating and renewing preference information that includes a plurality of preference values corresponding to a plurality of preference elements relating to the preferences for the content, the plurality of preference values being determined based on the preference operation history information, and
calculating a preference degree relating to the content using the generated and renewed preference information and the plurality of explanation information relating to the content, and recommending a specific portion of the content based on the preference degree.

13. An apparatus for automatic recommending of content, comprising:
preference operation history managing means for generating preference operation history information from a plurality of operations that is performed on particular content and that relates to preferences for the content and from a plurality of explanation information relating to the content, the preference operation history information being generated using a plurality of operation preference value parameters that correspond to a plurality of kinds of operations associated with the plurality of operations, and for picking up a keyword from the plurality of explanation information using a keyword dictionary when an operation other than a keyword registering operation is performed so as to include the picked up keyword in the preference operation history information;
preference information managing means for generating and renewing preference information that includes a plurality of preference values corresponding to a plurality of preference elements relating to the preferences for the content, the plurality of preference values being determined based on the preference operation history information; and
content recommending means for calculating a preference degree relating to the content using the generated and renewed preference information and the plurality of explanation information relating to the content, and for recommending a specific portion of the content based on the preference degree.

14. An apparatus according to claim 13, wherein the preference operation history managing means generates the history information by using a preference value parameter for each kind of the plurality of operations.

15. An apparatus according to claim 13, wherein the plurality of operations include a record reservation operation for the content, an erase protecting operation for the content and a keyword registering operation for searching the content.

16. An apparatus according to claim 13, wherein the preference information managing means generates and renews the preference information by using a coefficient parameter for each of the plurality of elements.

17. An apparatus according to claim 13, wherein the plurality of elements include a keyword, a genre, a content distribution time zone and a content distributing agency.

18. An apparatus according to claim 17, wherein a number of keywords included in the plurality of elements has a limitation and when the limitation is exceeded, at least one keyword having a preference value equal to or less than a predetermined value is deleted from the plurality of elements.

19. An apparatus according to claim 13, wherein the preference information managing means equally compresses all of the preference values relating to the elements included in the plurality of elements, including preference values which exceed a predetermined upper-limit value.

20. An apparatus according to claim 13, wherein the content recommending means makes a content record reservation for contents based on a size of vacant regions of the recording apparatus and a size of the preference degree for each of the contents.

21. An apparatus according to claim 13, wherein the content recommending means includes means for scheduling a content record reservation for the recommended portion of the content, the recommended portion of the content being recorded according to the content record reservation.

22. An automatic content recommending method, comprising:

providing a processor that carries out the following steps:

generating preference operation history information from a plurality of operations that is performed on particular content and that relates to preferences for the content and from a plurality of explanation information relating to the content, the preference operation history information being generated using a plurality of operation preference value parameters that correspond to a plurality of kinds of operations associated with the plurality of operations, and picking up a keyword from the plurality of explanation information using a keyword dictionary when an operation other than a keyword registering operation is performed so as to include the picked up keyword in the preference operation history information, generating and renewing preference information that includes a plurality of preference values corresponding to a plurality of preference elements relating to the preferences for the content, the plurality of preference values being determined based on the preference operation history information, and calculating a preference degree relating to the content using the generated and renewed preference information and the plurality of explanation information relating to the content, and recommending a specific portion of the content based on the preference degree.

23. A recording medium recorded with a computer program for executing a process for automatically recommending content, the process comprising:

generating preference operation history information from a plurality of operations that is performed on particular content and that relates to preferences for the content and from a plurality of explanation information relating to the content, the preference operation history information being generated using a plurality of operation preference value parameters that correspond to a plurality of kinds of operations associated with the plurality of operations, and picking up a keyword from the plurality of explanation information using a keyword dictionary when an operation other than a keyword registering operation is performed so as to include the picked up keyword in the preference operation history information;

generating and renewing preference information that includes a plurality of preference values corresponding to a plurality of preference elements relating to the preferences for the content, the plurality of preference values being determined based on the preference operation history information; and calculating a preference degree relating to the content using the generated and renewed preference information and the plurality of explanation information relating to the content, and recommending a specific portion of the content based on the preference degree.

24. A system, comprising:

a processor operable to execute instructions; and instructions for executing a process for automatically recommending content, the instructions including:

generating preference operation history information from a plurality of operations that is performed on particular content and that relates to preferences for the content and from a plurality of explanation information relating to the content, the preference operation history information being generated using a plurality of operation preference value parameters that correspond to a plurality of kinds of operations associated with the plurality of operations, and picking up a keyword from the plurality of explanation information using a keyword dictionary when an operation other than a keyword registering operation is performed so as to include the picked up keyword in the preference operation history information, generating and renewing preference information that includes a plurality of preference values corresponding to a plurality of preference elements relating to the preferences for the content, the plurality of preference values being determined based on the preference operation history information, and calculating a preference degree relating to the content using the generated and renewed preference information and the plurality of explanation information relating to the content, and recommending a specific portion of the content based on the preference degree.

25. An automatic content recommending apparatus, comprising:

a preference operation history managing section operable to generate preference operation history information from a plurality of operations that is performed on particular content and that relates to preferences for the content and from a plurality of explanation information relating to the content, the preference operation history information being generated using a plurality of operation preference value parameters that correspond to a plurality of kinds of operations associated with the plurality of operations;

a preference information managing section operable to generate and renew preference information that includes a plurality of preference values corresponding to a plurality of preference elements relating to the preferences for the content, the plurality of preference values being determined based on the preference operation history information; and preference degree relating to the content using the generated and renewed preference information and the plurality of explanation information relating to the content, and to recommend a specific portion of the content based on the preference degree.

26. An content recommending apparatus, comprising:

a preference operation history managing section operable to generate preference operation history information from a plurality of operations that is performed on particular content and that relates to preferences for the content and from a plurality of explanation information relating to the content, the preference operation history information being generated using a plurality of operation preference value parameters that correspond to a plurality of kinds of operations associated with the plurality of operations, and to pick up a keyword from the plurality of explanation information using a keyword dictionary when an operation other than a keyword registering operation is performed so as to include the picked up keyword in the preference operation history information;

a preference information managing section operable to generate and renew preference information that includes a plurality of preference values corresponding to a plurality of preference elements relating to the preferences for the content, the plurality of preference values being determined based on the preference operation history information; and a content recommending section operable to calculate a preference degree relating to the content using the generated and renewed preference information and the plurality of explanation information relating to the content, and to recommend a specific portion of the content based on the preference degree.

* * * * *